June 14, 1938. F. J. BAUMEISTER Re. 20,756

SIGN

Original Filed March 6, 1933

INVENTOR
Fritch J. Baumeister
Jones, Addington, Ames & Seibold
ATTYS

Reissued June 14, 1938

Re. 20,756

UNITED STATES PATENT OFFICE 20,756

SIGN

Fitch J. Baumeister, Park Ridge, Ill., assignor, by mesne assignments, to North American Service Company, Chicago, Ill., a corporation of Illinois Original No. 1,951,467, dated March 20, 1934, Serial No. 659,809, March 6, 1933. Application for reissue November 6, 1937, Serial No. 173,255

12 Claims. (Cl. 40—141)

This invention relates to improvements in illuminated signs, having for its object to provide an improved construction of sign of this type adapted for twenty-four hour service, particularly along highways, that is to say, a sign which will be illuminated during the day by the reflection of the daylight and during the night by the light emitted from the headlights of approaching motor vehicles or the like.

I am fully aware that various devices of this type have been heretofore employed, but these devices fail to accomplish effectively their purpose. One difficulty is the formation of moisture and frost upon the reflective surface or mirror in cold weather, which prevents the reflection of light illuminating the characters and renders the sign useless. Another difficulty is their inability to reflect the light rays so as to produce a sharply defined outline about the characters or a sharp contrast of illumination between the characters and the background.

An object of the invention is to provide a sign of exceedingly simple and inexpensive construction, which prevents the moisture or frost forming upon the mirror or reflective surface, and very effectively reflects the light, both at night and at day, to sharply define the characters and to prevent diffusion of the reflected light with the background.

A further object of the invention is to provide a sign of this type having the characters individually formed and mounted upon the background, thereby giving a very pronounced individuality to each character and very novelly accentuating its outline so that the sign as a whole will be very effective during the day even though not illuminated by direct rays. On the other hand, this individual formation and mounting of the characters allows the use of a construction preventing the deposit of moisture upon the mirror, viz., the use of an hermetical seal in a simple and practical manner about each character to prevent admission of moisture and a consequent formation of frost rendering the sign ineffective.

A further object of the invention is to provide a sign of simple and inexpensive construction, and of such attractiveness as to produce exceptional results.

A still further object of the invention is to provide means for producing effective reflection of light rays both during the day and night so as sharply to define the characters or display against the background whereby these characters or display may be distinctly seen at a distance.

Other objects and advantages of my invention will be apparent from the following detailed description when taken in connection with the accompanying drawing, which forms a part hereof.

Figure 3:
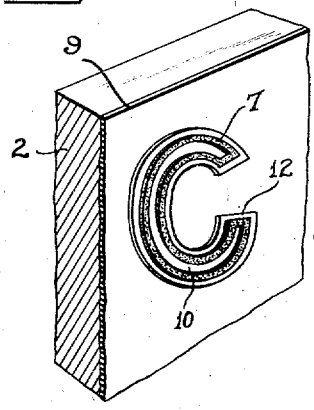
Figure 3A:
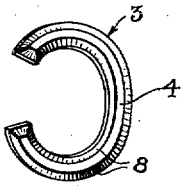
Figure 4:
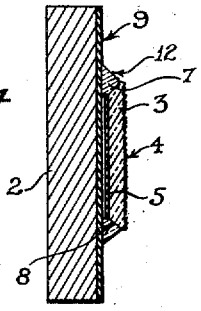

Figs. 3 and 3*a* are perspective views of the backing and a character to further illustrate the mounting of the character to the backing; and Fig. 4 is a view illustrating a modified structure.

Figure 1:
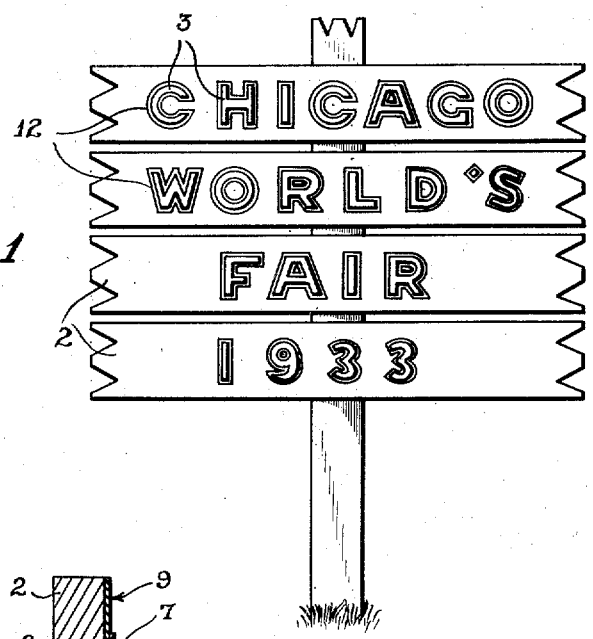
Fig. 1 is an elevation of a sign embodying the invention.
Figure 2:
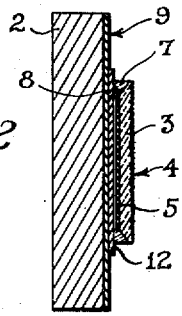
Fig. 2 is an enlarged vertical sectional view of one of the characters to illustrate the manner of mounting the same to the backing.

As illustrated in Fig. 1, a sign embodying my invention may be mounted adjacent a highway so that the light reflected from the headlights of approaching vehicles will illuminate the sign and provide a very effective and attractive display. This sign is also constructed for use during the day, the light rays striking the display in like manner so that there will be provided an effective and attractive display.

It will, however, be understood that the sign may be used for different purposes, and accordingly, its use is not limited to highways. Likewise, it will be definitely understood that the sign may be used in a variety of places and for indicating a variety of effects. To illustrate, I have found that the sign may be employed solely for illuminating purposes at public exhibitions or fairs where maximum illumination with minimum lighting expense is desirable, say for illuminating exterior or interior walls of buildings. The sign may be used for this purpose and accomplish astonishing results due to its remarkable light reflective properties. It will be seen, therefore, that it is not necessary to use the structure disclosed as a sign in the ordinary meaning of the term, because it may be used as an indicator, a symbol, signal or decorative design, with or without lettering or the like, and for a variety of different purposes.

As shown in the drawing, the sign comprises a mounting or backing 2, also known as a background, designed according to the style or shape of sign desired. Using a separate backing for each word of the display, as shown in Fig. 1, is not essential to the present invention, but very aptly increases the attractiveness of the sign in connection with the form of the characters, symbols, decorated designs, or other like indicia that may be employed thereon. Each character 3 may be individually mounted upon backing 2. These characters may be made of any suitable light-pervious material having a light diffusing surface 4 on one side and a mirror or light reflecting surface 5 on the other. Various forms of glass, such as moss, cathedral or chipped glass, may be used. It is desirable that the mirror or light reflecting surface 5 be in optical contact with the glass which may be accomplished by applying the material forming the light reflecting surface, say a coating of silver, mirrored glass, or the like, directly to the glass character. I find that excellent results are obtained when the mirror or reflecting surface 5 is in optical contact with the glass forming the characters, symbols, or indicia employed, and when applied to the side opposite to the light diffusing surface 4.

Each character 3 is cemented to backing 2 at and about its periphery as indicated at 7. The outer edge of the rear surface of such character is chamfered or beveled to provide a surface 8 for cement 7. A substantial grip is obtained if a beveled or chamfered surface 8 is provided.

To prevent moisture from reaching light reflecting surface 5, backing 2, which may be made of wood, is impregnated with linseed oil or other suitable solution to make it impervious to water. It will be remembered, of course, that backing 2 may be made of material other than wood and therefore will not necessarily require this waterproofing treatment. The front face of backing 2 may then be stained or otherwise treated or provided with a non-reflective surface 9.

A feature of the present invention resides in outlining characters 3, in marginal relation, with a light reflective band or narrow strip 12 comprising a portion of material 10. The material 10 is preferably of light-reflective character—for example, a light colored paint as distinguished from the mirror-reflective silver deposit 5. Thus, the material 10 has a reflective characteristic different from that of the characters 3. The light-reflective material 10 reflects light only where it is exposed, that is, only along the border 12. Consequently the exposed surface of the material 10 provides very definite outlines for the characters 3, but these light-reflective outlines themselves contrast with the non-reflective background 9. In a sense, the outlines constitute marginal buffer areas between the dark background 9 and the glare of light reflected by the mirror-like characters 3. This prevents any diffusion of the reflected light rays or merging of the letters with the background, such as heretofore found in devices of the prior art. I find that material 10 very aptly confines the reflected light within the distinguishing contours of the character, that is, the light which is reflected outwardly to illuminate the display. Material 10 seems to accentuate and to cause the characters 3 to stand out in bold effect, making the same very easily seen and very attractive at a distance. This phenomenon of increased visibility is discussed in greater detail toward the end of this specification.

On the other hand, I find that if material 10 is applied over the entire area covered by each character, a smooth surface may be provided, which, cooperating with cement 7, furnishes a very effective hermetical seal. Furthermore, this smooth surface tends to permit the retention of a negative pressure or vacuum between the characters and the backing, which increases the gripping effect and prevents admission of moisture to light reflective surface or material 5.

Material 10 may be any suitable light paint applied to the stained surface 9, or it may be porcelain or other material suitable for the purpose attached to backing 2. If the paint or other suitable material does not provide the required smooth surface, the backing 2 may be varnished, which also tends to preserve the stain or the non-reflective surface 9. Fig. 3 illustrates the manner in which material 10 may be applied to backing 2 to allow a sufficient marginal border or band 12 about each character. Cement 7 is preferably applied to the outer margin or beveled surface 8 of each character before the character is placed upon material 10, but this cement 7 may also be applied directly to material 10 before the characters 3 are placed in position. Pressing the characters tightly against material 10 with the mirror or light-reflecting surface 5 in position tends to displace all air beneath the character, so that, when cement 7 dries, a vacuum exists, which, as previously stated, increases the gripping effect and excludes moisture from coming into contact with mirror 5.

It will be apparent that the construction of each character and the manner of securing the same to backing 2 may be varied considerably without departing from the scope of the invention.

I find that material 10 may be omitted and that a sufficient marginal border or band 12 may be formed about each character or symbol by the cement 7, this being obtained, as shown in Fig. 4, by extending the cement 7 beyond the edge of the character or symbol. It will be readily noted that the cement 7 will perform the same purpose as material 10, although it may not extend, all round, uniformly from the edges of the characters or symbols. Likewise it seems to accentuate and cause the characters or symbols 3 to stand out in bold effect, making the same very easily seen and very attractive at a distance. This feature of a reflective margin or border 12 may be omitted when other features of the invention are employed.

From the foregoing description, it is obvious that the sign herein described may be used for day and night service and that it will effectively reflect the light and thus provide a brilliant and attractive display. Surrounding the characters 3 with light reflective margin 12 very effectively permits the use of the sign during the day and night, causing the lettering to stand out very prominently and preventing the reflected light from being diffused with the background. Mounting each character individually tends novelly to accentuate the outline thereof so as to make the sign as a whole a very effective display. Individually mounting the characters, while not essential to the invention, also allows the use of a simple and expedient construction, preventing the moisture from entering beneath the characters and from destroying the reflectivity of the mirror. The characters may be in script, or otherwise in one word, or in a unit symbol when employing certain features of the invention, say when adopting members 3 with a light diffusing surface 4 on one side and a light reflecting surface 5 on the opposite side, with the latter surface 5 so arranged as to prevent the elements from causing a frosting, clouding or other undesirable action destroying the light reflective properties of this surface.

I find that light thrown on the sign at night by the headlights of an automobile, or otherwise, does not tend to blind the traveler or cause any diffusion of the letters, which has been one of the difficulties in devices heretofore provided.

I also find that the sign may be used continuously throughout the year without evidencing any deposit or moisture or frost on the light reflecting surface 5. This advantageous result of continuous use throughout the year and under varying weather conditions without moisture or frost forming upon the light reflecting surface 5 is obtained by the novel arrangement of this surface 5 in optical contact with the glass figure and hermetically sealed to exclude moisture. Consequently, temperature changes will not result in condensation, formation of frost, or other effects destructive to or hampering the light reflective qualities thereof.

It will be clearly understood that I particularly direct my invention to a light reflective surface 5 in optical contact with the glass character or symbol 3 capable of reflecting light cast thereon so as to be usable at all times, and particularly at the time the light is cast thereon, as distinguished from characters having luminous paint which absorbs light only while it is cast thereon and is reflected at a later time, thus making the sign noticeable only at night for a brief period. Employing the novel form of mirror 5 capable of effectively reflecting the light as it is cast thereon, renders the sign usable at all times, and particularly during the time it is illuminated and intended to be most effective as a source of attraction. By the term sign, as used herein, I refer to any structure, whether decorative or not, which may or may not have lettering, designs, characters or symbols thereon, but which will embody the principle of construction shown and described herein.

I find that remarkable results will be obtained when the characters 3 are constructed with their front surface 4 capable of diffusing the light reflected from the rear surface having the mirror 5 in optical contact therewith.

By my design of sign, I may achieve a peculiar optimum of visibility for both day and night, whereby the several characters may be identified and distinguished with equal facility either in the daytime when illuminated by the general daylight or at night when illuminated by the headlights of an approaching automobile, for example. This results from bordering the mirror reflective character 3—the glass portion—of each letter with a less reflective portion—the outlining band 12 of light paint.

To explain this feature further consider the letter C, as an example. Daytime visibility results from a contrast between the letter C (comprising the mirror reflective character 3 and its light painted outlining bands 12) and the dark background 2. For best daytime visibility from a distance, there must be a certain relation between the width of the arcuate line forming the letter C and the height of the letter, as is well known to sign painters and typographers. Assume that the width of the arcuate line as shown, including its light painted outlining band 12, affords approximately that optimum relationship as seen in daylight upon the dark backing 2. If the full width of the line were of the mirror reflective glass (instead of only the central region between the marginal outlining bands 12 of light paint), the letter would suffer greatly in identifying visibility when seen at night.

This is especially true when the sign is seen by the occupants of an oncoming automobile, the headlights of which illuminate the sign. Despite the light diffusing characteristic of the surface 4, which the light rays traverse in passing to, and reflecting from, the mirror surface 5, the mirror surface does, nevertheless, reflect more or less straight back to the automobile a large proportion of the intense light of the headlights falling upon the area of the glass portion of the letter. To the occupants, this reflected light of the directed headlight beams is many times more intense, in contrast with the dark background, than is the reflected undirected and general daylight during the day. In fact, it is so intense that, like a star seen with the naked eye, it seems to shed a brilliant corona. This brilliant corona has the effect of optically magnifying the width of the arcuate line of the C.

If the full width of the arcuate line of the C were of mirror reflective glass, it would be difficult—if not impossible—for the occupants to tell whether the letter was C, O, Q, G or D. That is because the width of the arcuate line as well as its length would be out of proper relation to the height of the letter for good visibility. Also these brilliant coronas would make neighboring letters seem to overrun or blur together, further confusing the occupants. (Similar reading difficulties are often observed in electric signs which are overbrilliant and where the characters are not sufficiently "open"; in such signs the letters seem blurred and overrun.)

I avoid the ill effects of this brilliant corona phenomena by not making the full area of my daytime letter mirror reflective. I make the mirror reflective portion considerably narrower and complete the daytime width by the marginal outlining bands 12 of light paint. The brilliant corona then falls within, and more or less fills the area of, the marginal outlining bands 12. To the eyes of the occupants, the same relation of line width to height—and hence the same optimum of character distinguishing visibility—is realized at night as during the day.

The light reflective bands 12 are within the daytime line widths of the letters, and form marginal outlines for the mirror reflective characters 3, upon the non-reflective backing 2. The bands 12 thus narrow the nighttime illuminated width of the letters. The optical effect is to cause the illumination of each mirror reflective character 3 at night to contrast, with character distinguishing sharpness and visibility, with the non-reflective backing and with neighboring characters.

Although in daytime use the reflected light from the mirror reflective characters 3 give little, if any, corona effect, they do give brilliance to the letters, making them stand out much more than would light paint, while the light reflective outlining bands 12 extend the daytime width of the component lines of the letters to give the letters optimum daytime visibility.

The exclusion of any substantial air pressure between the characters 3 and the backing 2 utilizes atmospheric pressure to aid the cohering effect of the cement in holding the characters in place upon the backing. This is true even though the vacuum does not consist of a void or subatmospheric space between the characters and backing. The action of the vacuum then is akin to that between two contacting smooth and plane surfaces of Swedish measuring blocks, for example.

Without further elaboration, the foregoing will so fully explain the gist of my invention that others may, by applying current knowledge, readily adopt the same for use under varying conditions of service, without eliminating certain features, which may properly be said to constitute the essential items of novelty involved, which items are intended to be defined and secured to me by the following claims.

I claim:

1. A sign of the type disclosed consisting of a backing having a relatively non-reflective surface, light reflective characters on said backing, means for providing a relatively smooth surface upon said backing upon which said characters are mounted, said means being light reflective and forming a marginal outline about said characters whereby the illumination of each character will sharply contrast with the non-reflective surface of said backing and with the illumination of the other characters, and means forming a hermetical seal between said characters and said relatively smooth surface to prevent the admission of moisture beneath said characters.

2. A sign of the type disclosed consisting of a non-reflective backing, light reflective characters mounted upon said backing, a mirror between each character and said backing, and light reflective means forming a marginal outline of said characters upon said non-reflective backing whereby the illumination of each character will contrast with the non-reflective backing and with the illumination of the other characters.

3. A sign of the type disclosed consisting of a backing treated to be impervious to moisture, a coating applied to said backing to preserve said treatment and to provide a relatively smooth surface at least on one side, light reflective outlines upon said backing characterizing the designation of individual characters, corresponding character members superimposed upon the backing and outlined by said outlines, and hermetical sealing means for said character members to prevent the admission of moisture beneath said character members.

4. A sign of the type herein disclosed consisting of one or more light-reflective characters of light pervious material having a light diffusing surface and means for reflecting the light through the characters, a backing for said characters, and means for mounting said characters upon said backing with said light reflective means in hermetically sealed relation between said characters and said backing and with the air excluded to effect a vacuum therebetween whereby to increase the gripping action of said characters and prevent the admission of moisture to said light reflective means.

5. A sign of the type herein disclosed consisting of one or more light reflective characters of light pervious material having a light diffusing surface and a mirror in optical contact with the opposed surface for reflecting the light, a backing for said characters, said mirror being disposed between said characters and said backing, and cementitious material between said backing and the edges of said characters to provide a hermetical seal therebetween to prevent the admission of moisture to said mirror, the air being excluded to effect a vacuum whereby to increase the gripping action holding said characters upon said backing.

6. A sign of the type disclosed consisting of a backing relatively impervious to moisture, planar backed light reflective characters of light pervious material on said backing, mirrors for said characters at the planar backs thereof, means for providing a relatively smooth planar surface upon said backing upon which said characters are mounted with their planar backs thereagainst, and a material for securing said characters upon said backing and cooperating with said first means to hermetically seal the surface edges of said characters adjacent said backing and to protect said mirrors from contact with the air and moisture.

7. A sign of the type disclosed consisting of a backing or base member, light reflective characters of light pervious material individually mounted upon said backing, said characters having an outer light diffusing surface, a mirror in optical contact with the inner surface of each character and lying against the backing, and means for hermetically sealing said mirror to prevent moisture from contacting therewith.

8. A sign of the type disclosed consisting of a backing or base member, light reflective characters of light-pervious material individually mounted upon said backing, said characters having an outer light-diffusing surface and a smooth flat inner surface, a mirror in optical contact with, and carried as a deposit upon, the inner surface of each character, and means for hermetically sealing said mirror to the backing or base member to prevent moisture from contacting therewith.

9. A sign of the type disclosed, consisting of a backing having a relatively non-reflective surface, light reflective characters of translucent glass-like material on said backing, means for providing a relatively smooth surface upon said backing upon which said characters are mounted, the characters having smooth flat mirrored back surfaces and being mirror reflective, said means being light reflective but less so than the characters and forming a marginal outline about each said character whereby the illumination of each character will sharply contrast with the non-reflective surface of said backing and with the illumination of the other characters, and means forming a hermetical seal between said characters and said relatively smooth surface to prevent the admission of moisture beneath said characters.

10. A sign of the type disclosed consisting of a non-reflective backing, light reflective characters of sheet glass mounted upon said backing parallel therewith, a mirror between each character and said backing, the glass of the character having a smooth back surface carrying said mirror as a deposit thereon and a light diffusing front surface, and light reflective means, much less light reflective than the character, forming a marginal outline of said characters upon said non-reflective backing whereby the illumination of each character will contrast with the non-reflective backing and with the illumination of the other characters.

11. A sign of the type disclosed consisting of a non-reflective backing, light reflective characters of sheet glass mounted upon said backing parallel therewith, a mirror between each character and said backing, the glass of the character having a smooth back surface carrying said mirror as a deposit thereon and a light-diffusing front surface, and paint-like light reflective means, much less light reflective than the characters, forming a marginal outline of said characters upon said non-reflective backing whereby the illumination of each character will contrast with the non-reflective backing and with the illumination of the other characters.

12. A sign of the type disclosed comprising a backing having a smooth, flat, relatively non-reflecting surface forming a background field, individual flat planar light-pervious characters formed of sheet glass having planar back surfaces and light diffusing front surfaces, a mirror carried as a coating on the back surfaces of the characters, and means for individually mounting the characters superposed upon the backing with their back surfaces parallel with and substantially against the said background surface of the backing, said mounting means including a hermetical seal of the mirror to the surface of the backing to prevent moisture from contacting the mirror.

FITCH J. BAUMEISTER.